*Thomas & Mast,*
*Grain Drill.*

No. 112,093. Patented Feb. 21, 1871.

Witnesses:
T. C. Brecht.
M. Morley

Inventors.
John H. Thomas &
Phineas P. Mast.
by Dodge & Munro
Attys.

UNITED STATES PATENT OFFICE.

JOHN H. THOMAS AND PHINEAS P. MAST, OF SPRINGFIELD, OHIO.

Letters Patent No. 112,093, dated February 21, 1871.

IMPROVEMENT IN GRAIN-DRILLS.

The Schedule referred to in these Letters Patent and making part of the same.

*To all whom it may concern:*

Be it known that we, JOHN H. THOMAS and PHINEAS P. MAST, of Springfield, in the county Clark and State of Ohio, have invented certain Improvements in Grain-Drills, of which the following is a specification, reference being had to the accompanying drawing.

Our invention relates to that class of seeding-machines denominated grain-drills; one portion of the invention consisting in an arrangement of devices for automatically throwing out of gear the grass-seed distributer, this portion of the invention being applicable only to those machines which have attached to them a grass-seed distributing apparatus.

The other part of our invention consists in certain devices for adjusting the hoes, this portion of the invention being applicable to those machines which have their drill-tubes or hoes arranged to be shifted from one to two ranks or tiers, and *vice versa;* it now being customary to embody both these features, that is, the grass-seed distributer and the shifting hoes, in the same machine, though it is obvious that they may be used separately in machines, each being entirely independent of the other.

The general construction of our improved machine is the same as that heretofore described in our several patents, and which, being well known, need not be specially described.

In the accompanying drawing—

The frame A is rectangular in form, and mounted on wheels like a cart, as is usual in this class of machines.

Upon the axle T at one end is secured a spur-wheel, I, from which motion is given to the grain distributer in the grain-hopper H, and also to the grass-seed slide in the grass-seed hopper G. For imparting motion to the latter we arrange a pinion, P, over the wheel I, as shown in fig. 1, and on the inner end of its journal secure a crank, O, which is connected by a rod, *l*, with an elbow-lever, *u*, pivoted upon the top of the side bar of the frame A, this elbow lever *u* being connected by another rod, *p*, to the grass-seed slide or distributer in the hopper G, these parts being shown in figs. 1 and 2, the elbow-lever and its rods being the same as in our former patents.

Figure 1:
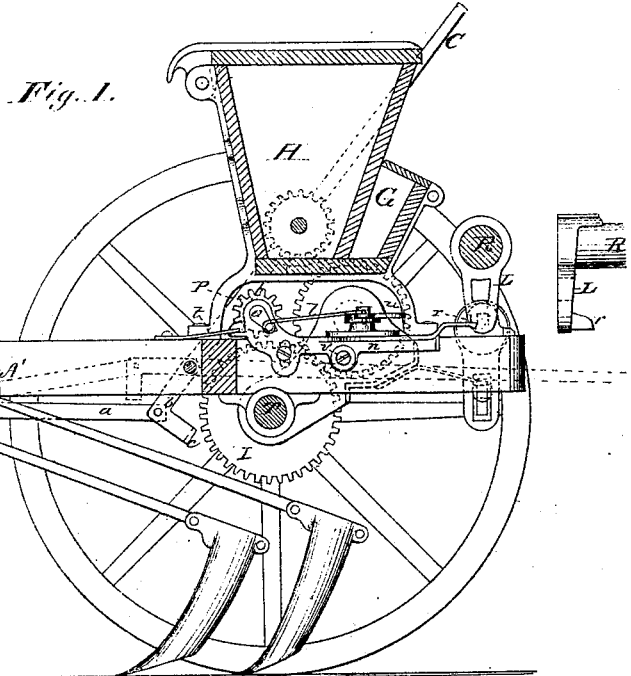
Figure 1 represents a longitudinal vertical section of the machine with our improvement applied thereto, and Figure 2, a top plan view of a portion of the same with the hopper detached.

The pinion P we now, however, mount in the front end of a plate or lever, *n*, which is pivoted to the inner side of the outer or side rail of the frame A by a bolt, *v*, as shown in fig. 1, its front end being held down by a spring, *t*, to hold the pinion P in gear with the wheel I, while its rear end extends back to the rear end of the frame where it projects under a lug, *r*, formed on the arm L of the shaft R, to which the hoes are connected by chains for raising and holding them clear of the ground.

This shaft R, with its arm L, is the same as heretofore used by us in our machines, but we have not heretofore constructed the arm with lug *r* at this end, a similar one having previously been used at the opposite end for another purpose. As shown in fig. 1, this lug *r* is arranged so that when the shaft R is turned up, as there represented, to elevate the hoes, it will strike upon the rear end of the plate or lever *n*, and by depressing its rear end will elevate its front end, thereby disengaging the pinion P from the wheel I, and thus automatically disconnect or stop the operation of the grass-seed slide or distributer.

It is obvious that when the shaft R is turned down the spring *t* will restore the lever *n* to its former position, thus again setting the grass-seed distributer in operation. By this improvement we dispense with a separate arrangement of devices for throwing out of gear the grass-seed distributer, and accomplish the desired result by the simple operation of raising the hoes.

Various plans have hitherto been devised for shifting the hoes from one to two rows and *vice versa*, as shown in our previous patents.

We have, however, devised a simpler and better plan than those formerly used, which is as follows:

One set of the hoes we attach to the second cross-bar A', and the other set to a sliding bar, B, the same as heretofore, the sliding bar B being supported upon rods *d*, as shown in fig. 1.

Figure 3:
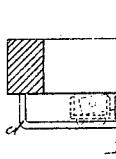
Figure 3 is a portion shown detached.
Figure 3:
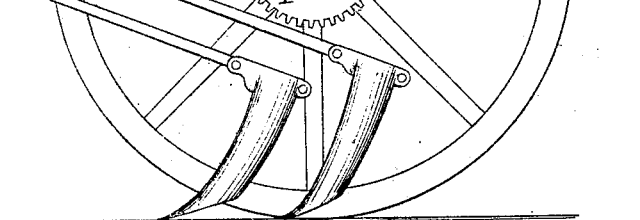
Figure 3:
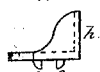

To guide this bar in its movement and prevent it from becoming worn and loose we secure to its under side, where it bears on the rods *d*, plates *h*, the form of which is shown in fig. 3. These plates are provided on their under sides with small projections *e*, or their equivalents, which are arranged to project down on opposite sides of the rods *d*, as shown in fig. 1, thus serving as guides.

Figure 2:
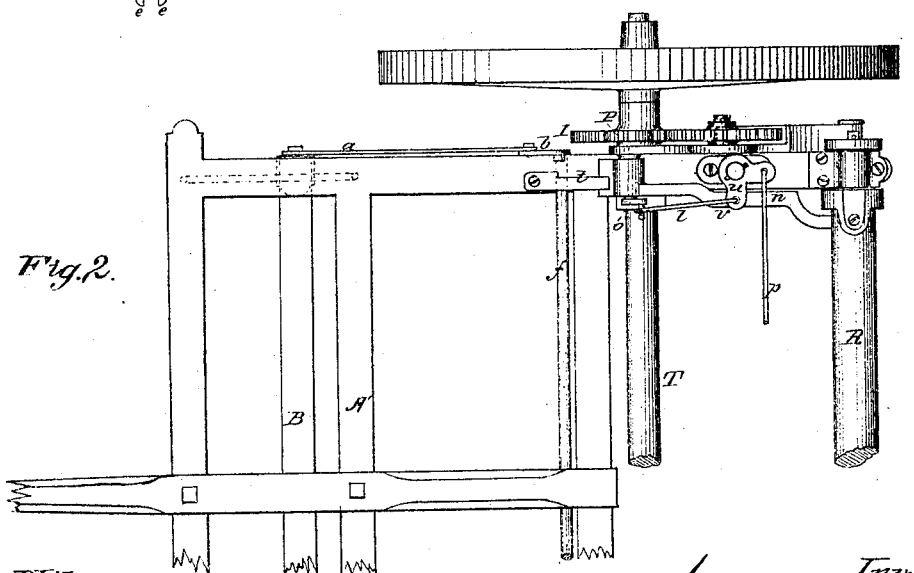

Transversely of the frame, in front of the axle, we mount a rock-shaft, *f*, having rigidly secured to each end outside of the frame an arm, *b*, one of these arms being prolonged to form a lever or handle, C, as shown in fig. 1, for operating the shaft and its arms. These arms *b* are connected at their lower ends by rigid rods or bars *a*, to the ends of the sliding bar B, as shown in figs. 1 and 2, so that by moving the lever C the bar B with its hoes may be moved forward or backward, as desired.

One of the arms *b* is made with a portion, Y, projecting backward at right angles from its lower end, as shown in fig. 1, and at its end this angular portion Y is provided with an inwardly-projecting lip, c, which, when the arm b is raised to the position indicated by the dotted lines in fig. 1, strikes against the under side of the frame, and thus prevents the shaft f with its arms from moving further, thereby locking the parts in position.

The length of this projecting part Y of the arm is such, that by the time the lip c strikes the frame the point of the rod a and arm b will be thrown past the center a little, as clearly shown by the dotted lines, and thus they are prevented from slipping back; and as the lip c prevents them moving further, the parts are thus securely locked in position.

Figure 4:

Instead of making the arm b with the angular arm Y and stop c, we may accomplish the same result by securing to the outside of the frame A one or more bent guides or stops, z, as shown in fig. 4. This guide z is made with a shoulder, as there shown, against which the bar a strikes as it is thrown up past the center, and thus serves as a stop in place of the lip c previously described.

Another advantage of this arrangement is that the depending arm of this piece z rests over or outside of the bar a, and thus prevents the latter from being doubled up or bent or sprung outward by the thrust or strain brought upon it. This device will be used on both sides of the machine, and there may be several of them used on each side, though two will be found sufficient, one being located near the point where the arm a is united to the crank or arm b, thus serving to support or hold both the bar and the crank and the other near the center of the bar a.

By these improvements we dispense with many of the parts heretofore used, and produce a very simple and efficient arrangement of devices for shifting the hoes.

Having thus described our invention,

What we claim is—

1. The pivoted plate or lever n, having the pinion P mounted thereon, and arranged to gear into the driving-wheel I, in combination with the arm L, provided with the lug r or its equivalent, arranged to operate substantially as described, for automatically disconnecting the grass-seed distributer by the rising of the hoes, as set forth.

2. A grain-drill, provided with a grass-seed sower, having its agitator connected with the operating mechanism, substantially as described, whereby the agitator is thrown out of gear by the elevating of the hoes, as set forth.

3. The plates h, provided with the projections e, or their equivalents, in combination with the sliding bar B and the supporting rods d, all arranged to operate substantially as set forth.

4. In combination with the lever C, the rock-shaft f and toggle-joints a b for simultaneously operating both ends of the sliding bar B and the drag-bars thereto attached, substantially as set forth.

JOHN H. THOMAS.
PHINEAS P. MAST.

Witnesses:
CHAS. R. CRAIN,
H. S. SHOWERS.